E. Hause,
Clothes Frame.
No. 88,566.      Patented Apr. 6. 1869.
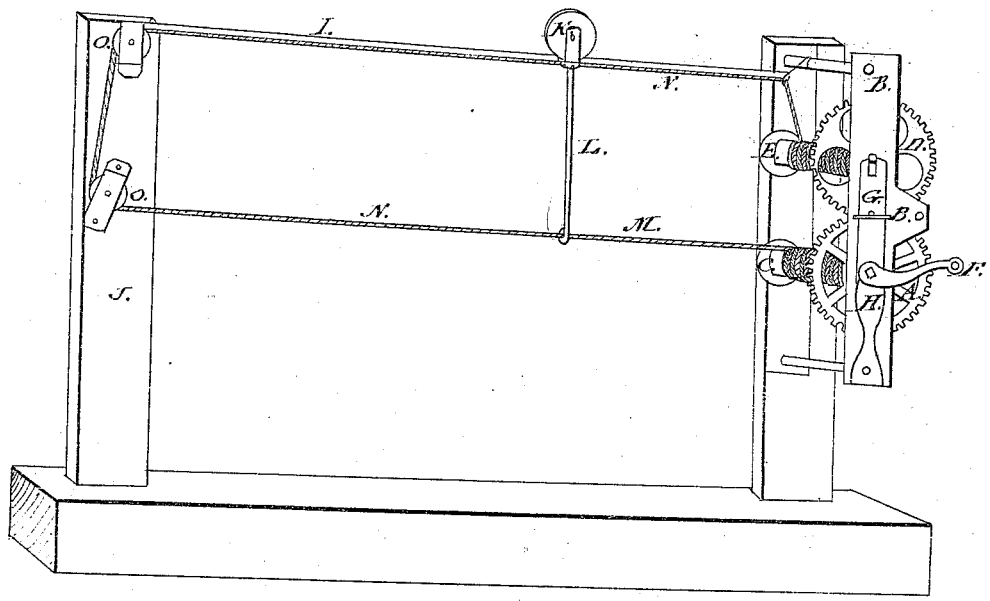
Witnesses:
H. F. Eberts
Jn. S. Day
Inventor:
Elmer Hause
Per attorney
Thos. S. Sprague

ELMER HAUSE, OF TECUMSEH, MICHIGAN.

Letters Patent No. 88,566, dated April 6, 1869.

IMPROVED CLOTHES-DRIER.

The Schedule referred to in these Letters Patent and making part of the same.

*To whom it may concern:*

Be it known that I, ELMER HAUSE, of Tecumseh, in the county of Lenawee, and State of Michigan, have invented a new and useful Improvement in Clothes-Drying Apparatus; and I do declare that the following is a true and accurate description thereof, reference being had to the accompanying drawings, and to the letters of reference marked thereon, and being a part of this specification.

This invention relates to an improvement in that class of clothes-driers which are operated by a person, in one position, unexposed, and consists in the employment of certain devices, by means of which the line may be tightened or slackened, as may be desired.

A, in the drawings, represents a cog-wheel, of any proper size, rigidly secured to a suitable shaft journalled into the frame B.

Upon this shaft is also secured the spool, or reel C, upon which to wind the clothes-line.

D is another cog-wheel, of the same size as the wheel A, similarly journalled, and provided with a like spool, or reel, E, upon which to wind the line, by means of which the clothes-line is extended.

These wheels A and D are so placed, relative to each other, that they engage with each other, the one communicating the motion desired, from the crank F to the other.

G is a slide, each end of which is slotted to engage with the two shafts upon which the cog-wheels are secured. This slide is properly secured to the frame B, and its use is, that when engaging with the lower shaft, it holds it in position, and the cog-wheel A in gear with the similar wheel D.

H is a spring, fastened to the lower part of the frame B, its upper end being slotted to engage with the lower shaft, which is provided with a shoulder for that purpose. Its use is, that when the slide G is disengaged from the lower shaft, and engaged with the upper one, the spring presses against the shoulder of the lower shaft, and throws it forward in its bearings sufficiently to allow the lower cog-wheel to be thrown out of gear with the upper wheel.

The frame B, with its above-described attachments, may be secured to the jamb-casing of a door, or in any other proper position, and so arranged that a person can stand in the door-way, or sheltered position, and hang clothes upon the line.

I is a wire, one end of which is secured to the top of the frame B, and the other end also secured to a suitable post, J, which may be placed at any suitable or desired distance away from the house.

This wire is designed as a rest, upon which travels the flanged wheel K, to which is secured the supporting-arm L, which, at its lower end, is looped around the clothes-line M, and is designed to sustain the clothes-line in its position, and prevent it deflecting toward the ground by the weight of the clothes. One of these supports K and L should be provided for about every twenty feet of clothes-line.

N is a line, of any suitable material which will bear exposure to the weather.

Its outer end is secured to the outer end of the clothes-line, and passes thence over the pulleys O, which are placed, at any desired distance apart, upon the post J, and thence is led and attached to the spool, or reel E.

M is a clothes-line, wound upon the spool, or reel C, its outer end being secured to the end of the line N, as heretofore described, which line should be twice the length of the clothes-line M.

The operator, wishing to hang out clothes, has the clothes-line wound up on its reel. By turning the crank, a portion thereof is unwound, and extended outward by means of the line N, which, by the same motion of the crank, is wound up on the upper reel. In this way, the clothes-line may be extended as far as necessary, the operator hanging the clothes upon it as it passes outward. Reversing this motion, the clothes-line is wound up on its reel, the operator removing the clothes as the line passes inward, when the clothes-line will be sheltered, dry, and clean for future use.

The spring H may be prolonged to form a lever, by means of which the geared wheels may be the more readily thrown out of their engagement with each other, when there is a heavy strain upon the lower of said geared wheels, by reason of the weight of clothes upon the clothes-line.

What I claim as my invention, and desire to secure by Letters Patent, is—

The spool C E, with gear-wheels A D, when operated as described, by means of the slide G and spring H, and used in connection with the cords M N, as and for the purpose described.

ELMER HAUSE.

Witnesses:
A. S. DOTY,
WM. K. POWERS.